United States Patent [19]

Nagai et al.

[11] Patent Number: 5,783,322
[45] Date of Patent: Jul. 21, 1998

[54] SECONDARY BATTERY PACK

[75] Inventors: Tamiji Nagai; Kazunori Ozawa, both of Kanagawa, Japan

[73] Assignee: Sony Corporation, Tokyo, Japan

[21] Appl. No.: 743,809

[22] Filed: Nov. 6, 1996

[30] Foreign Application Priority Data

Nov. 9, 1995 [JP] Japan ..................... 7-291442

[51] Int. Cl.$^6$ ........................................... H01M 10/48
[52] U.S. Cl. ........................ 429/7; 429/50; 429/61; 320/134
[58] Field of Search ........................ 429/7, 50, 61; 320/14, 30, 134

[56] References Cited

U.S. PATENT DOCUMENTS

| | | | |
|---|---|---|---|
| 4,085,358 | 4/1978 | Holcomb | 320/14 X |
| 4,992,340 | 2/1991 | Tidwell et al. | 429/7 |
| 5,547,775 | 8/1996 | Eguchi et al. | 429/7 |
| 5,582,928 | 12/1996 | Farley | 429/61 X |
| 5,648,713 | 7/1997 | Mangez | 320/14 X |

FOREIGN PATENT DOCUMENTS

| | | | |
|---|---|---|---|
| 8-163790 | 6/1996 | Japan | H02J 7/10 |
| 8-196044 | 7/1996 | Japan | H02J 7/10 |

Primary Examiner—Stephen Kalafut
Attorney, Agent, or Firm—Jay H. Maioli

[57] ABSTRACT

A secondary battery pack includes terminals connected to an external device, a rechargeable battery for storing and utilizing electric charges, a switching circuit for switching a state of the rechargeable battery between a charge state and a discharge state, a charge/discharge state detecting circuit for detecting a mode signal indicating that a charge operation or a discharge operation is to be carried out, a control circuit for controlling an operation of the switching circuit, a first power-source switching circuit which switches a supply of a power source to the control circuit and is controlled in response to a mode detected by the charge/discharge state detecting circuit, and a second power-source switching circuit which switches a supply of a power source to the control circuit and is controlled in response to a mode detected by the charge/discharge state detecting circuit.

26 Claims, 14 Drawing Sheets

SECONDARY BATTERY PACK

BACKGROUND OF THE INVENTION

1. Field of the Invention

The present invention relates to a secondary battery pack housing a secondary battery such as a lithium ion battery or the like and connected to a load apparatus and a charger, a method of controlling charge and discharge operations of a secondary battery, and an electronic apparatus employing the secondary battery pack.

2. Description of the Related Art

A secondary battery which is a rechargeable battery is sometimes used and housed in a case called a battery package. The battery package houses secondary batteries of a predetermined number connected in serial or parallel (sometimes houses only one secondary battery) so as to obtain a predetermined battery capacity. The battery package incorporates a circuit for protecting the secondary battery housed therein to prevent overcharge and overdischarge of the secondary battery and to prevent the secondary battery from being damaged by short circuit of a terminal unit.

FIG. 1 is a diagram showing an arrangement of a battery package housing a secondary battery. A battery package 1 has terminals 2, 3. A positive electrode of a secondary battery 4 having a predetermined charge capacity is connected to the positive-side terminal 2. Two field effect transistors FET1, FET2 are connected in serial between the negative-side terminal 3 and a negative electrode of the secondary battery 4. In this case, gates of the transistors FET1, FET2 are connected to a control circuit 5. A connection direction between a source and a drain of the transistor FET1 is set reversely to that of the transistor FET2. Specifically, the transistor FET1 is connected so as to restrict a current flowing from the secondary battery 4 toward the terminal 3 based on a signal obtained at its gate from the control circuit 5, while the transistor FET2 is connected so as to restrict a current flowing from the terminal 3 toward the secondary battery 4 based on a signal obtained at its gate from the control circuit 5. In this case, the respective transistors FET1, FET2 have parasitic diodes D1, D2 in which currents flow in the directions opposite to the directions where currents are restricted.

The control circuit 5 is connected with the positive and negative electrodes of the secondary battery 4 and is energized by a power source which is the secondary battery 4 connected thereto. The control circuit 5 detects a charge state or a discharge state of the secondary battery 4 by some suitable method to control the transistors FET1, FET2 in response to the detected state. The control circuit 5 controls the transistors FET1, FET2 as follows. If the control circuit 5 discriminates a state in which the secondary battery 4 is to be charged, the control circuit 5 sets the transistor FET1 in its on-state and the transistor FET2 in its off-state. If on the other hand the control circuit 5 discriminates a state in which the secondary battery 4 is to be discharged, the control circuit 5 sets the transistor FET1 in its off-state and the transistor FET2 in its on-state. When the secondary battery 4 is not to be charged nor discharged, the control circuit 5 sets both of the transistors FET1, FET2 at their off-states.

According to this arrangement, when the battery package 1 is connected to a charging device (not shown), the control circuit 5 detects connection to the charging device and sets the transistor FET1 in its on-state and the transistor FET2 in its off-state. Therefore, the current flows to the terminal 3 from the negative electrode of the secondary battery 4 through the parasitic diode D2 and the transistor FET1. As a result, the current from the charging device connected to the terminals 2, 3 is supplied to the secondary battery 4 to charge the secondary battery 4.

When the battery package 1 is connected to some load apparatus (not shown), the control circuit 5 detects connection to the load apparatus and sets the transistor FET1 in its off-state and the transistor FET2 in its on-state. Therefore, the current flows from the terminal 3 through the parasitic diode D1 and the transistor FET2 to the negative electrode of the second battery 4. As a result, the charging current from the second battery 4 flows from the terminal 2 toward the load apparatus, which allows a power source to be supplied from the secondary battery 4 to the load apparatus.

Since, as described above, the two field effect transistors FET1, FET2 are connected in serial and the control circuit 5 controls the transistors FET1, FET2 based on the discriminated results with respect to the charge/discharge state, the control circuit 5 can properly control a state of connection between the secondary battery 4 in the battery package 1 and an external device (a charging device or a load apparatus), which leads to effective protection of the secondary battery 4.

The control circuit 5 provided in the secondary battery pack 1 having the above-mentioned arrangement is formed of an arithmetic circuit such as a microcomputer or the like. The control circuit 5 must be supplied with a voltage of a power source, which is higher than a voltage allowing the control circuit 5 to operate, from the secondary battery 4 in order to operate as a control circuit. Therefore, if the secondary battery 4 is overdischarged due to some cause to reduce a residual capacity thereof and consequently the voltage across the positive and negative electrodes of the second battery 4 becomes very low, then the battery package 1 cannot be used.

It is assumed that the battery package 1 shown in FIG. 1 uses the secondary battery 4 whose voltage is 4.2 V when full-charged and the control circuit 5 can be operated with at least 2.5 V. Under this condition, there can be employed such a method in which, when the voltage of the secondary battery 4 is lowered to a voltage a little higher than 2.5 V (e.g., 2.7 V) upon discharge of the secondary battery 4, the control circuit 5 carries out the control for stopping the discharge of the secondary battery 4 to prevent the voltage from being lowered by overdischarge to the voltage disabling the control circuit 5 to be operated. However, even when the control circuit 5 stops the discharge and keeps the battery voltage at the lowered voltage of 2.7 V, if the battery package 1 is left in this state for a long period of time, then the secondary battery 4 is self-discharged and consequently the battery voltage is gradually lowered to 2.5 V or lower.

Once such discharge occurs, even if the battery package 1 is connected to a charging device, the control circuit 5 is not operated. As a result, the transistor FET1 is not set in its on-state, which prevents the secondary battery 4 from being charged. Then, the battery package 1 cannot be used.

Moreover, other than the above device, when the positive-electrode side terminal 2 of the battery package 1 and the negative-electrode side terminal 3 thereof are short-circuited due to some cause, similarly the control circuit 5 is not supplied with a normal power source, thereby being disabled to set the transistors FET1, FET2 in their on-states.

SUMMARY OF THE INVENTION

In view of such aspects, it is an object of the present invention to provide a battery package and a method of controlling charge and discharge operations which make it possible to use the secondary battery even when an unsatisfactory state such as an overdischarge or the like occurs.

According to a first aspect of the present invention, a secondary battery pack includes a terminal means connected to an external device, a rechargeable battery means for storing and utilizing electric charges, a switching means for switching a state of the rechargeable battery means between a charge state thereof and a discharge state thereof, a charge/discharge state detecting means for detecting a mode signal indicating that a charge operation or a discharge operation is to be carried out, a control means for controlling an operation of the switching means, a first power-source switching means which switches a supply of a power source to the control circuit and is controlled in response to a mode detected by the charge/discharge state detecting circuit, and a second power-source switching means which switches a supply of a power source to the control circuit and is controlled in response to a mode detected by the charge/discharge detecting state circuit.

According to a second aspect of the present invention, a connection to a load apparatus or a charger is detected. A charge or discharge mode to be operated is detected. A switching means is set in a predetermined state. If the charge mode is detected, then a power source is supplied from the charger to a control means and the switching means is set in its charge mode. If on the other hand the discharge mode is detected, then a power source is supplied from a secondary battery to a control means and the switching means is set in its discharge mode.

According to a third aspect of the present invention, an electronic apparatus with a secondary battery includes the secondary battery pack according to the first aspect of the present invention, a battery terminal means connected to the secondary battery pack, an external power-supply terminal means connected to an external power supply, and a functional circuit means connected to the battery terminal means or the external power supply terminal means for carrying out a predetermined operation.

DESCRIPTION OF THE PREFERRED EMBODIMENTS

A battery package according to a first embodiment of the present invention will hereinafter be described with reference to FIGS. 2 to 8.

Figure 2:
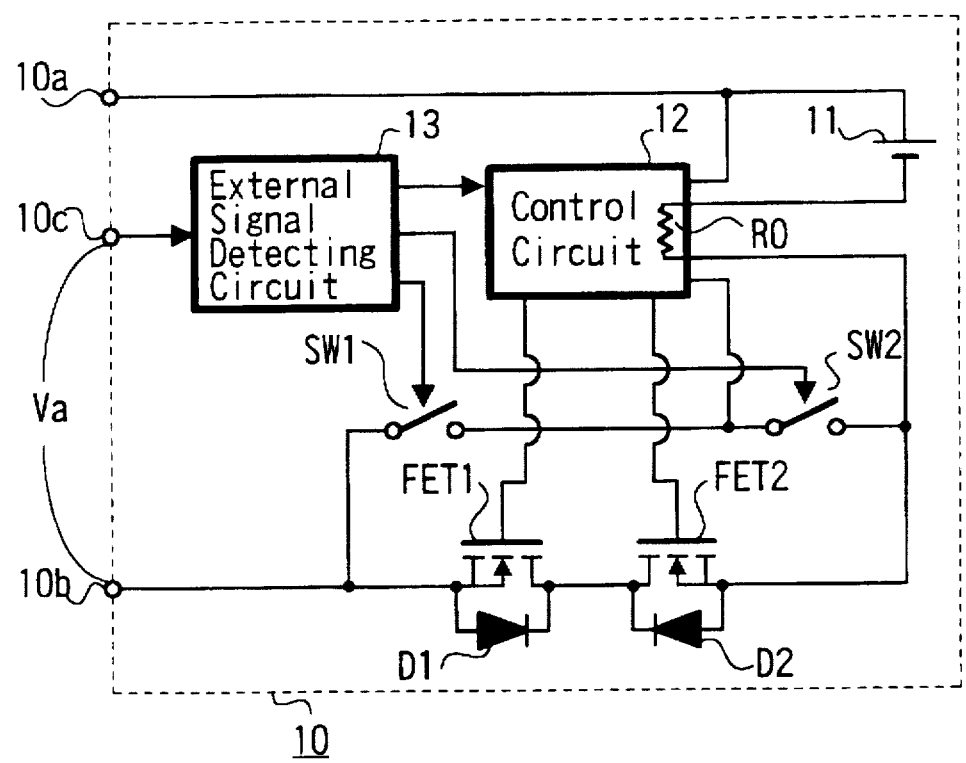
FIG. 2 is a diagram showing an arrangement of a battery package according to a first embodiment of the present invention.

FIG. 2 is a block diagram showing an arrangement of the battery package according to the first embodiment of the present invention. A battery package 10 according to the first embodiment has terminals 10a, 10b used for charging and discharging a secondary battery 11, a terminal 10c, the secondary battery 11, a control circuit 12, an external-signal detecting circuit 13, field effect transistors FET1 and FET2, switches SW1 and SW2, a resistor R0, and diodes D1 and D2. A positive electrode of the secondary battery 11 having a predetermined charge capacity is connected to the positive side terminal 10a. In this case, a lithium ion battery is used as the secondary battery 11. The resistor R0 and the two field effect transistors FET1, FET2 are connected in serial between the negative side terminal 10b and the negative electrode of the secondary battery 11. In this case, the resistor R0 is a resistor for detecting charging/discharging currents by the control circuit 12. Gates of the respective transistors FET1, FET2 are connected to the control circuit 12. A connection direction between a source and a drain of the transistor FET1 is set reversely to that of the transistor FET2. Specifically, the transistor FET1 is connected so as to restrict a current flowing from the secondary battery 11 toward the terminal 10b based on a signal obtained at its gate from the control circuit 12, while the transistor FET2 is connected so as to restrict a current flowing from the terminal 10b toward the secondary battery 11 based on a signal obtained at its gate from the control circuit 12. In this case, the diodes D1, D2 are connected which allow currents to flow in the directions opposite to the directions where the respective transistors FET1, FET2 restrict currents.

The control circuit 12 is formed of an integrated circuit which detects a charge state of the battery package 10 or a discharge state thereof and controls the transistors FET1 and FET2 in response to the detected state. In this case, a power source supplied from an external device (such as a charger or the like) connected to the terminals 10a, 10b or the secondary battery 11 is employed as a power source for operating the control circuit 12. Specifically, a positive-side power-source input unit of the control circuit 12 is connected between the positive electrode side of the secondary battery 11 and the terminal 10a. A negative-side power-source input unit of the control circuit 12 is connected between one ends of the connection switches SW1 and SW2. The other end of the connection switch SW1 is connected to a point between the terminal 10b and the transistor FET1. The other end of the connection switch SW2 is connected to a point between the transistor FET2 and the resistor R0. Connection states of the connection switches SW1 and SW2 are controlled by the external-signal detecting circuit 13.

The external-signal detecting circuit 13 detects a signal supplied from the outside of the battery package 10 to the terminal 10c (the signal supplied from the charger or a load apparatus connected to the battery package 10) to thereby detect the charge state and the discharge state. Specifically, the external-signal detecting circuit 13 detects a potential of a signal supplied to the terminal 10c of the battery package 10 (this potential is a potential Va between the terminals 10b and 10c) to thereby detect the charge state or the discharge state based on the detected state of the potential Va.

When the external-signal detecting circuit 13 detects the charge state, the external-signal detecting circuit 13 controls the connection switch SW1 to be in its on-state. When the external-signal detecting circuit 13 detects the discharge state, the external-signal detecting circuit 13 controls the connection switch SW2 to be in its on-state. When the external-signal detecting circuit 13 detects neither the charge state nor the discharge state, the external-signal detecting circuit 13 controls both the connection switches SW1 and SW2 to be in their off- states.

Since the switches SW1 and SW2 are controlled as described above, when the external-signal detecting circuit 13 detects the charge state, the connection switch SW1 is brought in its on-state and then the power supply is supplied from an equipment (charger) connected to the terminals 10a, 10b of the battery package 10 to the control circuit 12 to operate the control circuit 12. When the external-signal detecting circuit 13 detects the discharge state, the connection switch SW2 is brought in its on-state and then the power supply is supplied from secondary battery 11 of the battery package 10 to the control circuit 12 to operate the control circuit 12.

The external-signal detecting circuit 13 supplies information about the detected charge state or the detected discharge state to the control circuit 12 thus supplied with the power source. The control circuit 12 controls the transistors FET1 and FET2 based on the supplied information. Specifically, if the control circuit 12 discriminates based on the supplied information regarding the state in which the secondary battery 11 is to be charged, the control circuit 12 sets the transistor FET1 in its on-state and the transistor FET2 in its off-state. If the control circuit 12 discriminates based on the supplied information regarding the state in which the secondary battery 11 is to be discharged, the control circuit 12 sets the transistor FET1 in its off-state and the transistor FET2 in its on-state. If the control circuit 12 is not supplied with either of the informations about the charge state and the discharge sate, then the control circuits circuit 12 sets both of the transistors FET1 and FET2 in their off-states.

Figure 3:
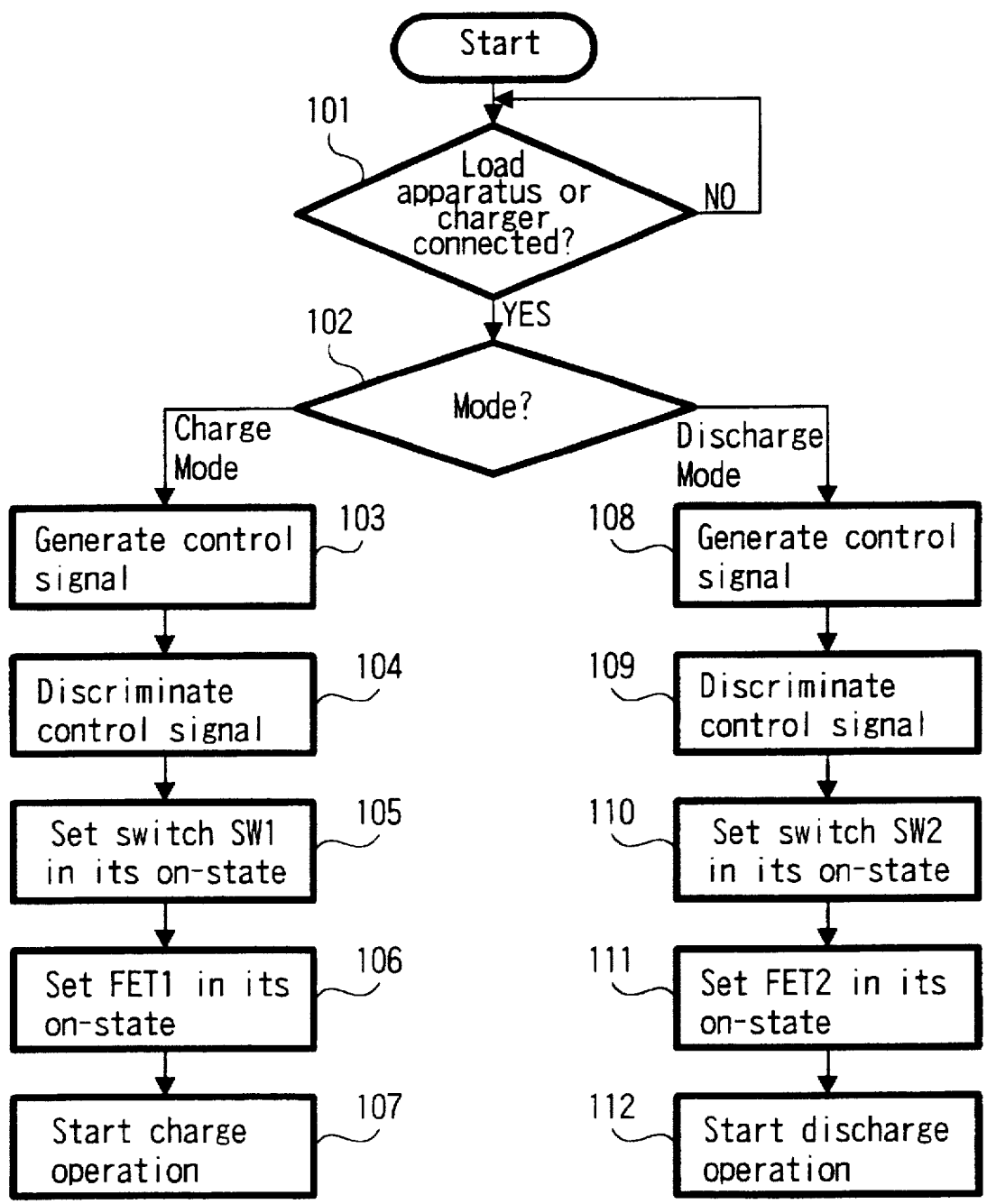
FIG. 3 is a flowchart used to explain charge and discharge operations of the battery package according to the first embodiment.

Charge and discharge operations of the battery package 10 thus arranged will be described with reference to FIG. 3 which is a flowchart therefor. In step 101, the battery package 10 is connected to the load apparatus or the charger, and then its charge or discharge operation is started. The processing proceeds to step 102. When the battery package 10 is connected to the load apparatus or the charger, it must be discriminated whether the charge processing or the discharge processing is to be carried out. Therefore, it is discriminated in step 102 whether the mode is set as the charge mode or the discharge mode.

When the mode is set as the charge mode in step 102, the processing proceeds to step 103, wherein the charger connected to the battery package 10 generates a control signal having a predetermined potential and indicating that the charger is to charge the secondary battery 11, and supplies the generated control signal through the terminal 10c to the external-signal detecting circuit 13 of the battery package 10. The processing proceeds to step 104, wherein the external-signal detecting circuit 13 discriminates the supplied control signal. At this time, since the external-signal detecting circuit 13 detects the potential corresponding to the charge state, the processing proceeds to step 105, wherein the connection switch SW1 is set in its on-state. The processing proceeds to step 106. In step 106, when the connection switch SW1 is brought in its on-state, the power supply from the connected charger side is supplied to the control circuit 12 in the battery package 10, thereby the control circuit 12 being operated. The control circuit 12 discriminates the charge state based on the signal from the external-signal detecting circuit 13, and sets the transistor FET1 in its on-state. When the transistor FET1 is brought in its on-state, the processing proceeds to step 107, wherein the current from the charger is supplied to the secondary battery 11, thereby the charge operation of the secondary battery 11 being started.

After the charge operation is started, if the control circuit 12 determines that the state of the battery package 10 is the full-charged state by determining the potential between the positive and negative electrodes of the secondary battery 11 (an arrangement for determining it is not shown in FIG. 2) and by detecting a charging current by using the resistor R0, then the control circuit 12 sets the transistor FET1 to its off-state again and stops the charge.

When the mode is set as the discharge mode in step 102, the processing proceeds to step 108, wherein the load apparatus connected to the battery package 10 generates a control signal having a predetermined potential and indicating that the discharge of the secondary battery 11 is to be started, and supplies the generated control signal through the terminal 10c to the external-signal detecting circuit 13 of the battery package 10. The processing proceeds to step 109, wherein the external-signal detecting circuit 13 discriminates the supplied control signal. At this time, since the external-signal detecting circuit 13 detects the potential corresponding to the discharge state, the processing proceeds to step 110, wherein the connection switch SW2 is set in its on-state. The processing proceeds to step 111. In step 111, when the connection switch SW2 is brought in its on-state, the power supply is supplied from the secondary battery 11 in the battery package 10 to the control circuit 12, thereby the control circuit 12 being operated. The control circuit 12 discriminates the discharge state based on the signal from the external-signal detecting circuit 13, and sets the transistor FET2 in its on-state. When the transistor FET2 is brought in its on-state, the processing proceeds to step 112, wherein the current from the secondary battery 11 is supplied to the load apparatus connected to the terminals 10a, 10b, thereby the discharge operation of the secondary battery 11 is started.

After the discharge operation of the secondary battery 11 is started, if the control circuit 12 determines, by determining the potential between the positive and negative electrodes of the secondary battery 11, that it is not preferable to continue the discharge operation any longer, then the control circuit 12 sets the transistor FET2 to its off-state again, thereby the discharge operation of the secondary battery 11 is stopped.

Figure 1:
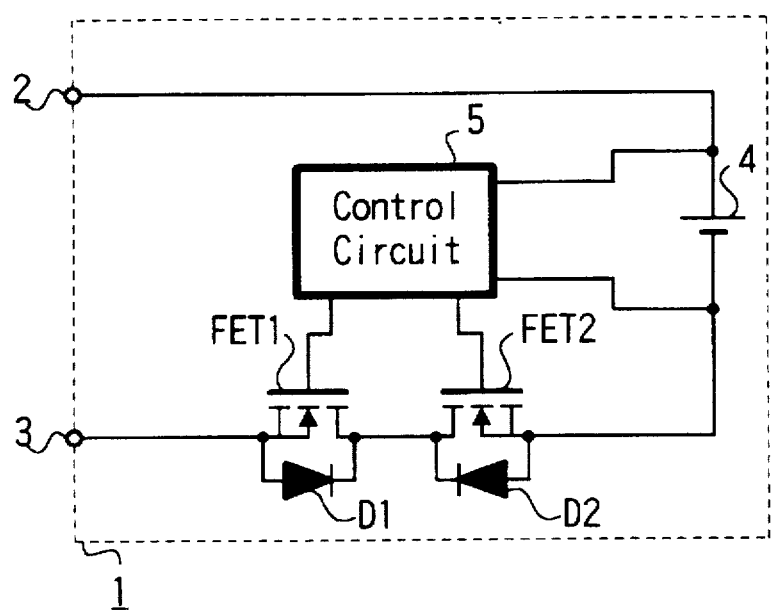
FIG. 1 is a diagram showing an arrangement of a battery package by way of example.

Since the charge operation and the discharge operation are controlled as described above, the battery package 10 according to this embodiment allows the secondary battery 11 incorporated therein to be charged and discharged regardless of the state of the secondary battery 11. Specifically, the control circuit 12 which is a circuit for protecting the incorporated secondary battery 11 requires a power source for its operation. In the arrangement shown in FIG. 1, the control circuit 5 is always supplied with the power source from the incorporated secondary battery 4. However, when a self-discharge of the secondary battery 4 or the like lowers a voltage of the secondary battery 4 between the terminals 2, 3 to an extent that it is difficult to operate the control circuit 5, then the control circuit 5 is not operated, which prevents the transistor FET1 from being set in its on-state to start charging the secondary battery 4. On the other hand, according to the battery package 10 of the first embodiment, since the charger supplies the power source for operation to the control circuit 12 when the secondary battery 11 is being charged, even if the voltage of the secondary battery 11 therein is considerably lowered, then the control circuit 12 can carry out the control for starting the charge operation, which can prevent the secondary battery 11 from being not charged (i.e., which can prevent the battery package 10 from becoming incapable of being used).

Figure 4:
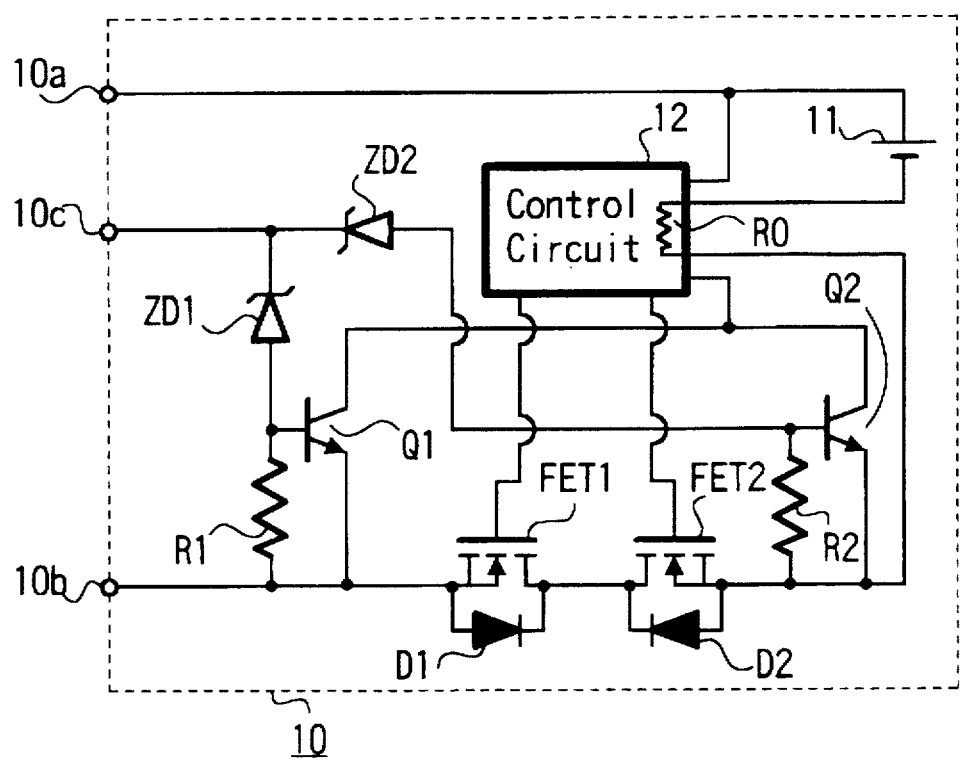
FIG. 4 is a diagram showing a specific circuit of the battery package according to the first embodiment.

While a specific arrangement for controlling the connection switches SW1, SW2 is not described with reference to FIG. 2, various switch control systems based on voltage detection can be applied thereto. For example, an arrangement formed of a Zener diode and a transistor may be employed. Specifically, as shown in FIG. 4, the terminal 10c is connected through a serial circuit formed of a Zener diode ZD1 and a resistor R1 to the terminal 10b, and a middle point of connection between the Zener diode ZD1 and the resistor R1 is connected to a base of an NPN type transistor Q1. An emitter of the transistor Q1 is connected to a point between the transistor FET1 and the terminal 10b. The terminal 10c is also connected through a serial circuit formed of a Zener diode ZD2 and a resistance R2 to a point between the transistor FET2 and the resistor R0. A middle point of connection between the Zener diode ZD2 and the resistor R2 is connected to a base of an NPN type transistor Q2. An emitter of the transistor Q2 is connected to a point between the transistor FET2 and the resistor R0. Collectors of the transistors Q1, Q2 are connected to the negative-side power-source input unit of the control unit 12.

Resistance values of the resistors R1, R2 are set in accordance with the voltages of the control signals obtained at the terminal 10c when the secondary battery 11 is charged and discharged.

This arrangement allows the transistors Q1, Q2 to function as the connection switches SW1, SW2 shown in FIG. 2, respectively. Specifically, when the control signal of the potential indicating that the secondary battery 11 is to be charged is supplied to the terminal 10c, the transistor Q1 is set in its on-state, thereby the control circuit 12 being supplied with the power source from the external equipment (the charger). When the control signal of the potential indicating that the secondary battery 11 is to be discharged is supplied to the terminal 10c, the transistor Q2 is set in its on-state, thereby the control circuit 12 being supplied with the power source from the secondary battery 11.

An arrangement for supplying the control signal obtained at the terminal 10c to the control circuit 12 side is not shown in FIG. 4 showing the arrangement of the battery package 10 according to the first embodiment.

While in the above arrangement the control circuit 12 carries out the control for immediately starting the charge or discharge operation based on the signal supplied from the outside, the control circuit 12 may detect the state of the secondary battery 11 before starting the charge or discharge operation.

Figure 5:
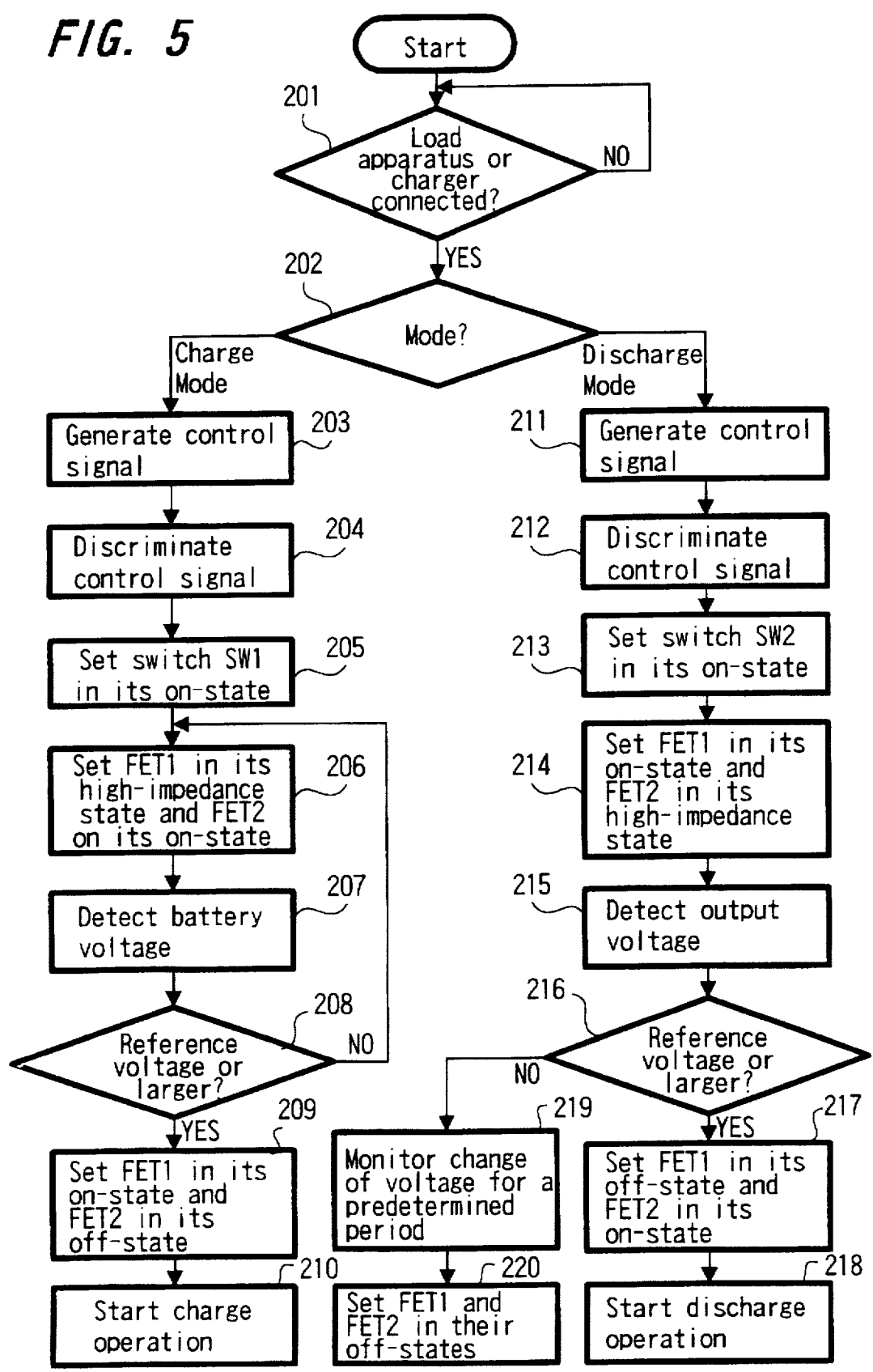
FIG. 5 is a flowchart used to explain charge and discharge operations (employing an impedance control) of the battery package according to the first embodiment.

A processing for detecting a state of the secondary battery 11 will be described with reference to FIG. 5 which is a flowchart therefor, by way of example. In this example, the transistor FET1 or FET2 is set in its high-impedance state to thereafter detect a battery voltage, and if there is no abnormality, then the charge or discharge operation is started. Specifically, in step 201, when being connected to the charger or the load apparatus, the operation of the battery package 10 is started. Then, the processing proceeds to step 202. When the battery package 10 is connected to the load apparatus or the charger, it must be discriminated whether the charge processing or the discharge processing is to be carried out. Therefore, it is discriminated in step 202 whether the mode is set as the charge mode or the discharge mode.

When the mode is set as the charge mode in step 202, the processing proceeds to step 203, wherein the charger connected to the battery package 10 generates a control signal having a predetermined potential and indicating that the charger is to charge the secondary battery 11, and supplies the generated control signal through the terminal 10c to the external-signal detecting circuit 13 of the battery package 10. The processing proceeds to step 204, wherein the external-signal detecting circuit 13 discriminates the supplied control signal. At this time, since the external-signal detecting circuit 13 detects the potential corresponding to the charge state, the processing proceeds to step 205, wherein the connection switch SW1 is set in its on-state. When the connection switch SW1 is brought in its on-state, the power supply from the connected charger side is supplied to the control circuit 12 in the battery package 10, thereby the control circuit 12 being operated. The control circuit 12 discriminates the charge state based on the signal from the external-signal detecting circuit 13. The processing proceeds to step 206.

In step 206, based on the discriminated results, the control circuit 12 sets the transistor FET1 in its high-impedance state and the transistor FET2 in its on-state. The processing proceeds to step 207, wherein the control circuit 12 detects the battery voltage of the secondary battery 12 in this state. The processing proceeds to step 208, wherein the control circuit 12 determines whether or not the battery voltage is equal to or higher than a voltage allowing an ordinary charge operation (reference voltage). If it is determined in step 208 that the detected voltage value is lower than the reference voltage, then the processing returns to step 206 and the transistors FET1 and FET2 are kept in its high-impedance state and its on-state, respectively. In this state, a small charging current flows through the secondary battery 11. Therefore, within a long period of time, the secondary battery 11 is gradually charged to increase the battery voltage, i.e., the secondary battery 11 is gradually charged without being damaged by rapid charging.

If in step 208 the control circuit 12 detects that the battery voltage is equal to or higher than the reference voltage, then the processing proceeds to step 209, wherein the control circuit 12 sets the transistor FET1 in its on-state and the transistor FET2 in its off-state. The processing proceeds to step 210, wherein the ordinary charge operation (i.e., the rapid charge operation using a comparatively large charge current) is started.

When the mode is set as the discharge mode in step 202, the processing proceeds to step 211, wherein the load apparatus connected to the battery package 10 generates a control signal having a predetermined potential and indicating that the secondary battery 11 is to be discharged, and supplies the generated control signal through the terminal 10c to the external-signal detecting circuit 13 of the battery package 10. The processing proceeds to step 212, wherein the external-signal detecting circuit 13 discriminates the supplied control signal. At this time, since the external-signal detecting circuit 13 detects the potential corresponding to the discharge state, the processing proceeds to step 213, wherein the connection switch SW2 is set in its on-state. When the connection switch SW2 is brought in its on-state, the power supply from the secondary battery 11 is supplied to the control circuit 12, thereby the control circuit 12 is operated. The control circuit 12 discriminates the discharge state based on the signal from the external-signal detecting circuit 13. The processing proceeds to step 214.

In step 214, based on the discriminated results, the control circuit 12 sets the transistor FET1 in its on-state and the transistor FET2 in its high-impedance state. The processing proceeds to step 215, wherein the control circuit 12 detects the output voltage of the secondary battery 11 in this state. The processing proceeds to step 216, wherein the control circuit 12 determines whether or not an output voltage is equal to or higher than a voltage suitable for carrying out the discharge operation (reference voltage). If it is determined in step 216 that the detected voltage value is equal to or higher than the reference voltage, then the processing proceeds to step 217, wherein the control circuit 12 sets the transistor FET1 in its off-state and the transistor FET2 in its on-state. The processing proceeds to step 218, wherein the discharge operation is started.

If it is determined in step 216 that the detected voltage is lower than the reference voltage, then the processing proceeds to step 219, wherein the control circuit 12 monitors change of the output voltage for a predetermined time. Then, the processing proceeds to step 220, wherein the transistors FET1 and FET2 are set in their off-states and the discharge operation is stopped.

Figure 6:
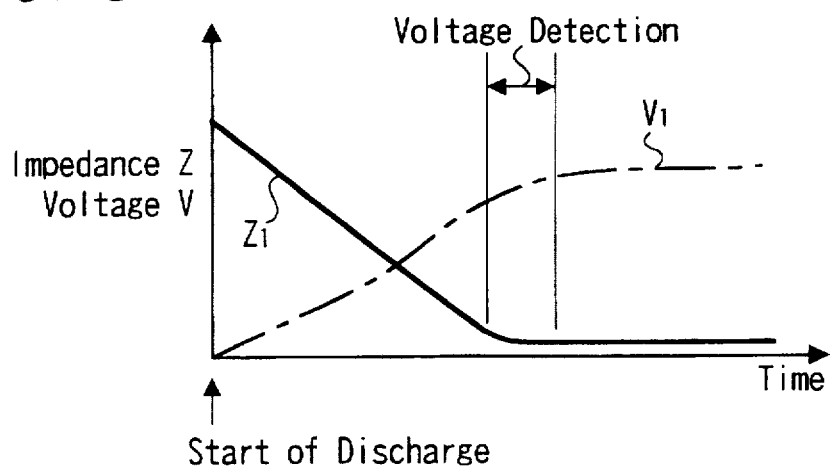
FIG. 6 is a characteristic graph showing discharge characteristics of the battery package according to the first embodiment.

When the control circuit 12 monitors the change of the output voltage in step 219, an impedance of the transistor FET2, for example, may be changed to detect the change of the voltage across both ends of the resistor R0 at that time. Specifically, as shown in FIG. 6, if a residual capacity of the secondary battery 11 is within a normal range, then a voltage $V_1$ across both ends of the resistor R0 is gradually increased when the impedance $Z_1$ of the transistor FET2 is gradually lowered after the beginning of the discharge. If the increase of the voltage $V_1$ is detected, then it may be determined that the secondary battery 11 is in its dischargeable state, thereby the discharge operation being continued. If on the other hand the voltage $V_1$ across both ends of the resistor R0 is not increased even when the impedance $Z_1$ is gradually lowered, then it is determined that the residual capacity of the secondary battery 11 is small, and the discharge operation is stopped.

As described above, since, before the charge or discharge operation, the transistor FET1 or FET2 for controlling the charge or the discharge operation is set in its high-impedance state to detect the state of the secondary battery 11, it is possible to prevent the charge or discharge operation from being carried out when the residual capacity of the secondary battery 11 is small, and consequently it is possible to prevent the incorporated secondary battery 11 from being deteriorated.

Figure 7:
FIG. 7 is a diagram showing a timing at which a transistor is switched in the first embodiment.

Instead of setting the transistor FET1 or FET2 in its high-impedance state, the corresponding transistor FET1 or FET2 may be periodically switched between its on-state and its off-state to thereby be set in a substantially same state as its high-impedance state. Specifically, as shown in FIG. 7 (in FIG. 7, a rise period of a pulse represents an on-state and a decay period thereof represents an off-state), the transistor FET1 or FET2 is periodically set in its on-state within a short period of time, thereby being set in the same state as the high-impedance state.

Figure 8:
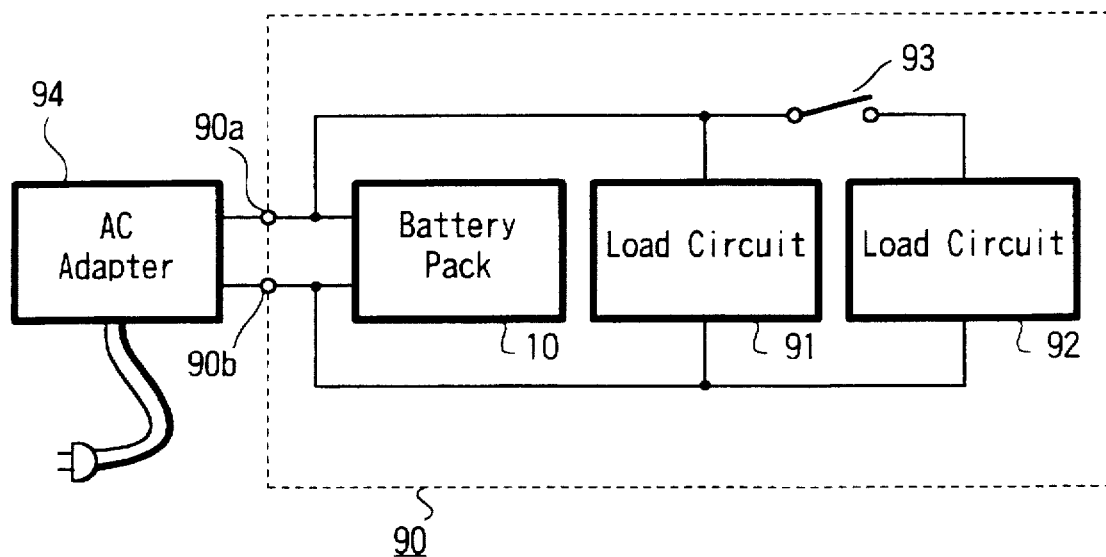
FIG. 8 is a diagram showing an arrangement of a load apparatus to which the battery package according to the first embodiment is connected.

A connection state of the battery package 10 arranged as described above will be described. As shown in FIG. 8, the battery package 10 according to this embodiment is loaded into a load apparatus 90. The terminals 10a, 10b of the battery package 10 are connected directly to a load circuit 91 which needs to be constantly operated in the load apparatus 90, and also connected through a switch 93 to a load circuit 92 which is selectively operated. If this arrangement is applied to, for example, a portable telephone (radio telephone) as the load apparatus 90, then reception system circuits which need to be intermittently operated while waiting for a call correspond to the load circuit 91 which need to be constantly operated, and circuits which need to be operated upon a telephone call correspond to the load circuit 92 which is selectively operated. Terminals 90a, 90b of the load apparatus 90 may be connected to an AC adaptor 94 which is a charger while the battery package 10 is being loaded into the load apparatus 90.

According to this arrangement, when the residual capacity of the secondary battery 11 in the battery package 10 is small, the secondary battery 11 can be charged by a DC low-voltage power source obtained by rectification and transformation of a commercial AC power source by the AC adaptor 94. The load circuits 91, 92 can be operated by the discharge operation of the secondary battery 11 in the battery package 10 and, if the AC adaptor 94 is still connected thereto, can be operated by the power source from the AC adaptor 94. If the battery package 10 having the arrangement shown in FIG. 2 is connected with the AC adaptor 94, then the load apparatus 90 supplies the control signal indicating that the charge operation is to be carried out, to the terminal 10c of the battery package 10. If on the other hand the battery package 10 is not connected with the AC adaptor 94, the load apparatus 90 needs to supply the control signal indicating that the discharge operation is to be operated, to the terminal 10c of the battery package 10.

Figure 9:
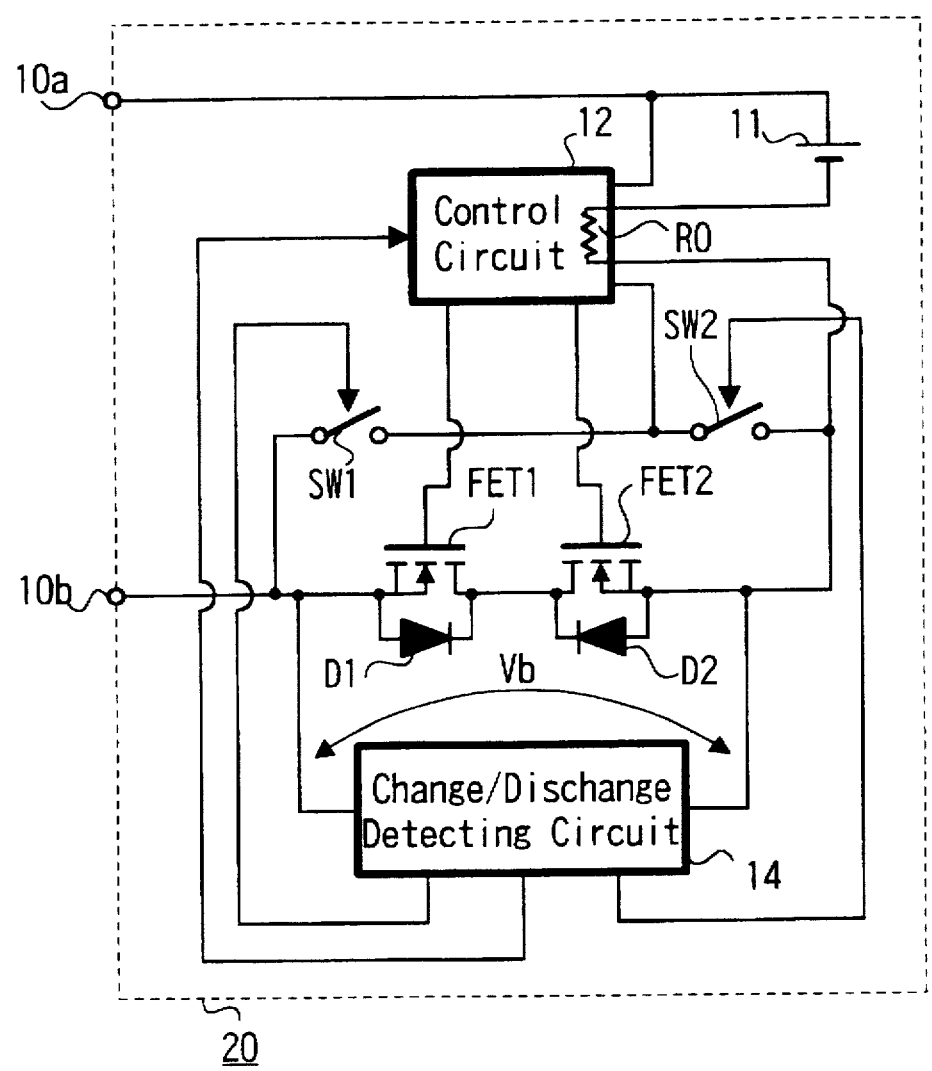
FIG. 9 is a diagram showing an arrangement of a battery package according to a second embodiment of the present invention.

A battery package according to a second embodiment of the present invention will be described with reference to FIG. 9. In FIG. 9 showing the battery package according to the second embodiment, like parts and units corresponding to those shown in FIG. 2 showing the battery package according to the first embodiment are marked with the same reference numerals and hence need not to be described in detail.

According to the second embodiment, the charge state or the discharge state is detected in the battery package, and hence the control signal indicative of the charge state or the discharge state does not need to be supplied form the outside. A battery package 20 according to the second embodiment is arranged as shown in FIG. 9. In the second embodiment, the battery package 20 has a charge/discharge detecting circuit 14. The charge/discharge detecting circuit 14 detects a polarity of a potential difference Vb between a voltage at a connection point between a terminal 10b and a transistor FET1 and a voltage at a connection point between a transistor FET2 and a resistor R0. When the polarity of the potential difference Vb is detected, if the voltage on the transistor FET2 side is higher than the voltage on the transistor FET1 side, then the charge/discharge detecting circuit 14 detects that the state of the secondary battery 11 is the charge state. When the polarity of the potential difference Vb is detected, if the voltage on the transistor FET1 side is higher than the voltage on the transistor FET2 side, then the charge/discharge detecting circuit 14 detects that the state of the secondary battery 11 is the discharge state.

Connection switches SW1, SW2 are controlled based on the detected state. Specifically, when the charge/discharge detecting circuit 14 detects the charge state, then the connection switch SW1 is set in its connected state. When the charge/discharge detecting circuit 14 detects the discharge state, then the connection switch SW2 is set in its connected state.

In the second embodiment, other parts and units of the battery package 20 are arranged similarly to the battery package 10 according to the first embodiment.

According to the battery package 20 of the second embodiment, since the charge state or the discharge state is detected in the battery package 20, the control signal indicative of the charge state or the discharge state does not need to be supplied from the outside and the arrangement of the device (a load apparatus or a charger) connected to the battery package can be simplified to that extent. Moreover, a terminal (a terminal 10c shown in FIG. 2) for receiving the control signal does not need to be provided in the battery package 20 and hence the arrangement of the battery package 20 can be simplified.

In the second embodiment, when the charge operation or the discharge operation is started, the transistor FET1 or FET2 may be set in its high-impedance state to detect the state of the secondary battery 11.

Figure 10:
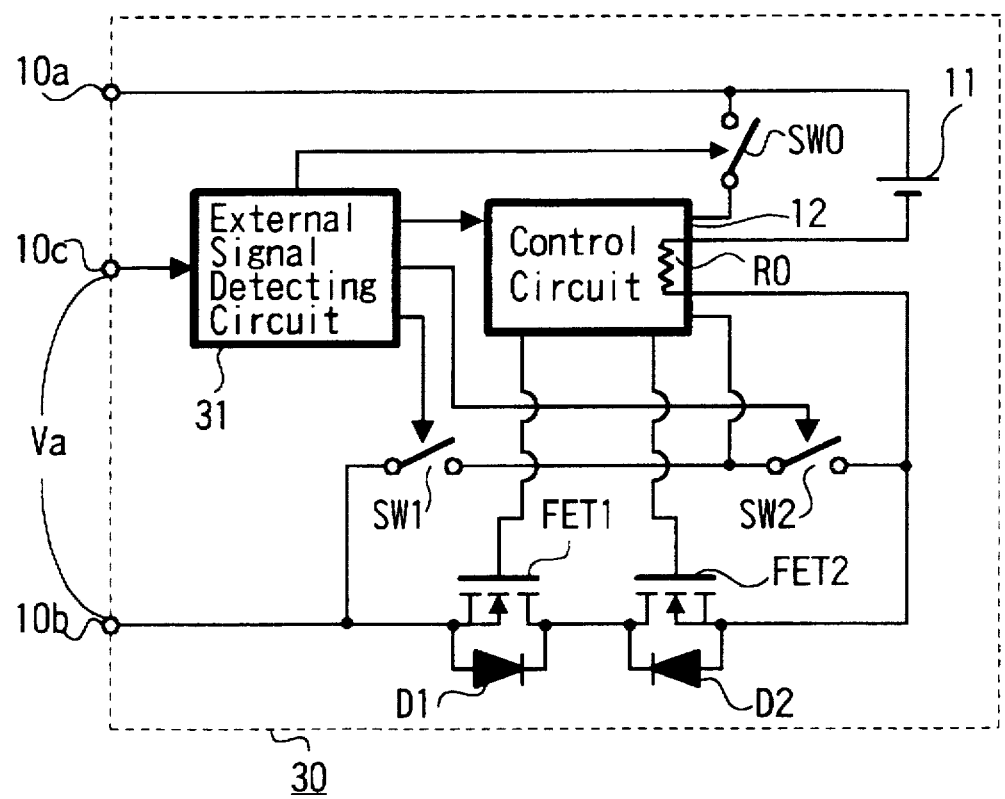
FIG. 10 is a diagram showing an arrangement of a battery package according to a third embodiment of the present invention.

A battery package according to a third embodiment of the present invention will be described with reference to FIG. 10. In FIG. 10 showing the battery package according to the third embodiment, like parts and units corresponding to those shown in FIG. 2 showing the battery package according to the first embodiment are marked with the same reference numerals and hence need not to be described in detail.

A battery package 30 according to the third embodiment has a connection switch SW0 provided between a positive-side power-source input unit of a control circuit 12 and a middle point of connection between a positive electrode of a secondary battery 11 and a terminal 10a. The connection switch SW0 is controlled under the control of an external-signal detecting circuit 31. In this case, the external-signal detecting circuit 31 detects a voltage Va of a control signal supplied from a terminal 10c. When detecting the charge state, the external-signal detecting circuit 31 sets the connection switches SW0 and SW1 in their on-states. When detecting the discharge state, the external-signal detecting circuit 31 sets the connection switches SW0 and SW2 in their on-states. Thus, the power source is supplied to the control circuit 12.

Other parts and units of the battery package 30 are arranged similarly to the battery package 10 according to the first embodiment shown in FIG. 2.

Since the battery package 30 is arranged as shown in FIG. 10, similarly to the first embodiment, even when the incorporated secondary battery 11 is overdischarged, it is possible to charge the secondary battery 11 because the power source is supplied to the control circuit 12. According to the battery package 30 of the third embodiment, when the charge operation or the discharge operation is not carried out, the power-source input unit of the control circuit 12 is completely separated from other parts of the battery package 30. Therefore, even if the terminals 10a, 10b of the battery package 30 are short-circuited, for example, then it is possible to protect the control circuit 12 and so on.

In the third embodiment, when the charge operation or the discharge operation is started, the transistor FET1 or FET2 may be set in its high-impedance state to detect the state of the secondary battery 11.

Figure 11:
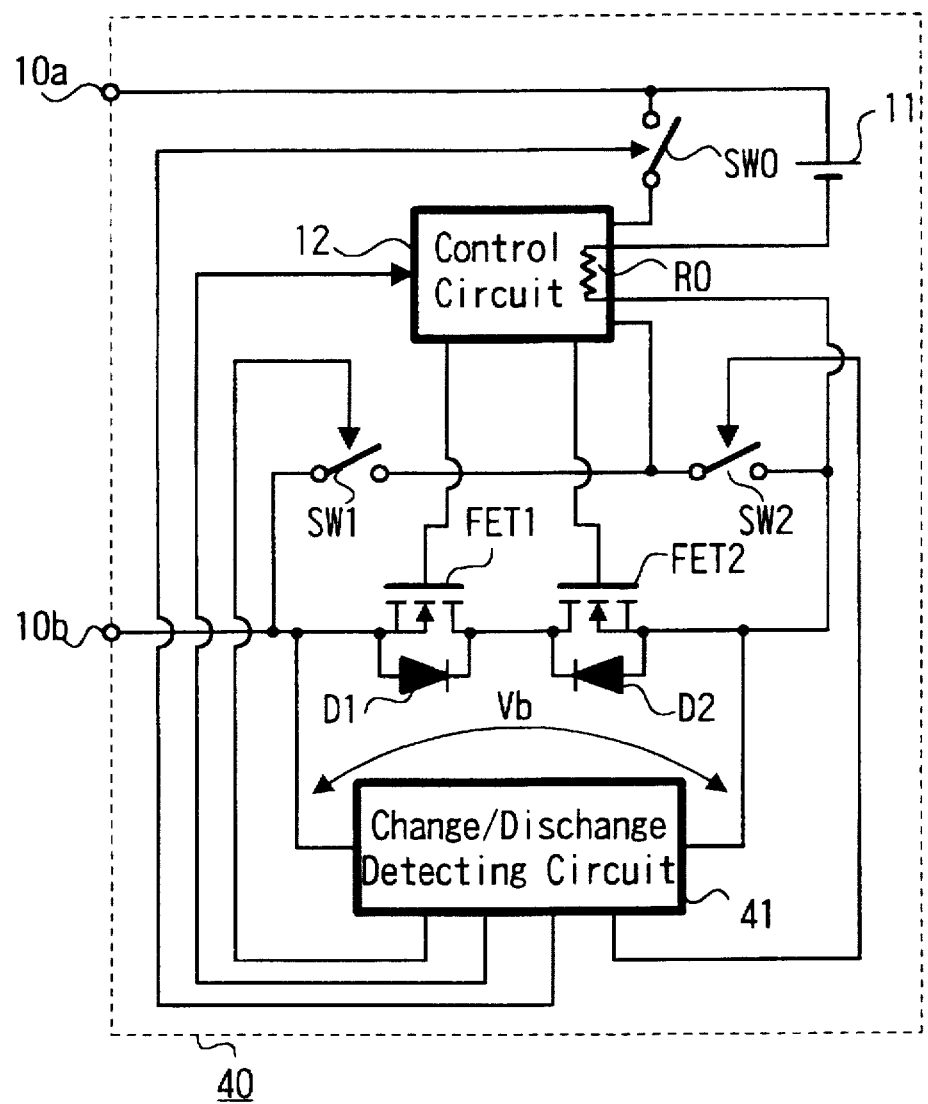
FIG. 11 is a diagram showing an arrangement of a battery package according to a fourth embodiment of the present invention.

A battery package according to a fourth embodiment of the present invention will be described with reference to FIG. 11. In FIG. 11 showing the battery package according to the fourth embodiment, like parts and units corresponding to those shown in FIGS. 2, 9 and 10 showing the battery package according to the first, second and third embodiments are marked with the same reference numerals and hence need not to be described in detail.

A battery package 40 according to the fourth embodiment shown in FIG. 11 is arranged such that the battery package 20 according to the second embodiment shown in FIG. 9 has the connection switch SW0 according to the third embodiment shown in FIG. 10. Specifically, the connection switch SW0 is provided between a positive-side power-source input unit of a control circuit 12 and a middle point of connection between a positive electrode of a secondary battery 11 and a terminal 10a. The connection switch SW0 is controlled under the control of an charge/discharge detecting circuit 41 incorporated in the battery package 40. The charge/discharge detecting circuit 41 detects a polarity of a potential difference Vb between a voltage at a connection point between a terminal 10b and a transistor FET1 and a voltage at a connection point between a transistor FET2 and a resistor R0. When the polarity of the potential difference Vb is detected, if the voltage on the transistor FET2 side is higher than the voltage on the transistor FET1 side, then the charge/discharge detecting circuit 41 detects that the state of the secondary battery 11 is the charge state. When the polarity of the potential difference Vb is detected, if the voltage on the transistor FET1 side is higher than the voltage on the transistor FET2 side, then the charge/discharge detecting circuit 41 detects that the state of the secondary battery 11 is the discharge state.

Connection switches SW0, SW1 and SW2 are controlled based on the detected state. Specifically, when the charge/discharge detecting circuit 41 detects the charge state, then the connection switches SW0 and SW1 are set in their connected states. When the charge/discharge detecting circuit 41 detects the discharge state, then the connection switches SW0 and SW2 are set in their connected states.

Other parts and units of the battery package 40 are arranged similarly to the battery package 20 according to the second embodiment shown in FIG. 9.

Since the battery package 40 according to the fourth embodiment is arranged as shown in FIG. 11, similarly to the second embodiment, the charge state and the discharge state are detected in the battery package 40, which enables both of arrangements of the battery package 40 and a device connected thereto to be simplified. Similarly to the third embodiment, even if the terminals 10a, 10b of the battery package 40 are short-circuited, then it is possible to protect the control circuit 12 and so on.

Even in the fourth embodiment, when the charge operation or the discharge operation is started, the transistor FET1 or FET2 may be set in its high-impedance state to detect the state of the secondary battery 11.

A battery package according to a fifth embodiment of the present invention will be described with reference to FIG.

Figure 12:
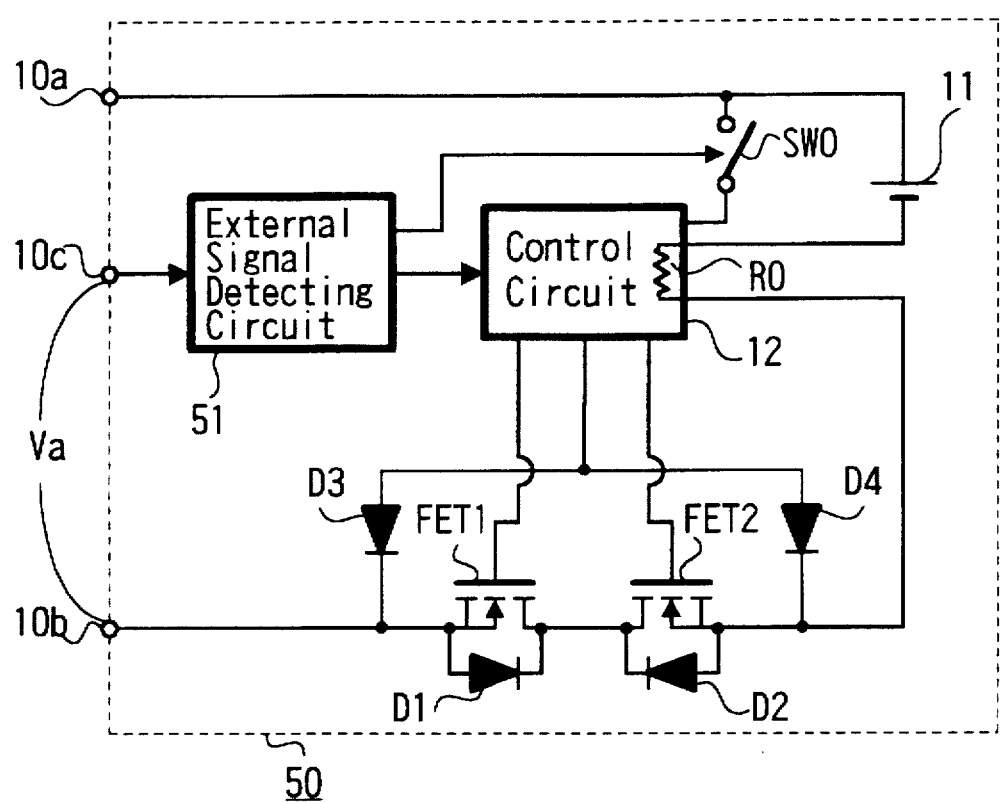
FIG. 12 is a diagram showing an arrangement of a battery package according to a fifth embodiment of the present invention.

12. In FIG. 12 showing the battery package according to the fifth embodiment, like parts and units corresponding to those shown in FIGS. 2 and 10 showing the battery package according to the first and third embodiments are marked with the same reference numerals and hence need not to be described in detail.

A battery package 50 according to the fifth embodiment shown in FIG. 12 has diodes D3, D4 instead of the switches SW1 and SW2 for controlling supply of a power source to the control circuit 12. Specifically, a negative-side power-source input unit of a control circuit 12 is connected to anodes of the diodes D3, D4. A cathode of the diode D3 is connected to a connection point between a terminal 10b and a transistor FET1, and a cathode of the diode D4 is connected to a connection point between a transistor FET2 and a resistor R0.

An external-signal detecting circuit 51 for detecting a signal from the outside obtained at a terminal 10c detects the charge state and the discharge state based on a voltage Va of the supplied signal. When detecting a control signal indicative of the charge state or the discharge state, the external-signal detecting circuit 51 sets a switch SW0 in its connected state to supply the power source to the control circuit 12. In this case, when a secondary battery 11 is charged, the power source is supplied to the control circuit 12 through the switch SW0 and the diode D3, and when the secondary battery 11 is discharged, the power source is supplied to the control circuit 12 through the switch SW0 and the diode D4. The external-signal detecting circuit 51 supplies the information of the detected charge state or the detected discharge state to the control circuit 12, which enables the control circuit 12 to control the transistors FET1, FET2 based on the corresponding state.

In the fifth embodiment, other parts and units of the battery package 50 are arranged similarly to the battery package 30 according to the third embodiment shown in FIG. 10.

According to the fifth embodiment, since the switches SW1, SW2 are not provided, the switch controlled by the external-signal detecting circuit 51 is only the switch SW0, which simplifies the arrangement for controlling the switch of the battery package to that extent. As described in the first embodiment, the positive-side power-source input unit of the control circuit 12 may be connected directly to the positive-electrode of the secondary battery 11 without the switch SW0 being provided.

In the fifth embodiment, when the charge operation or the discharge operation is started, the transistor FET1 or FET2 may be set in its high-impedance state to detect the state of the secondary battery 11.

Figure 13:
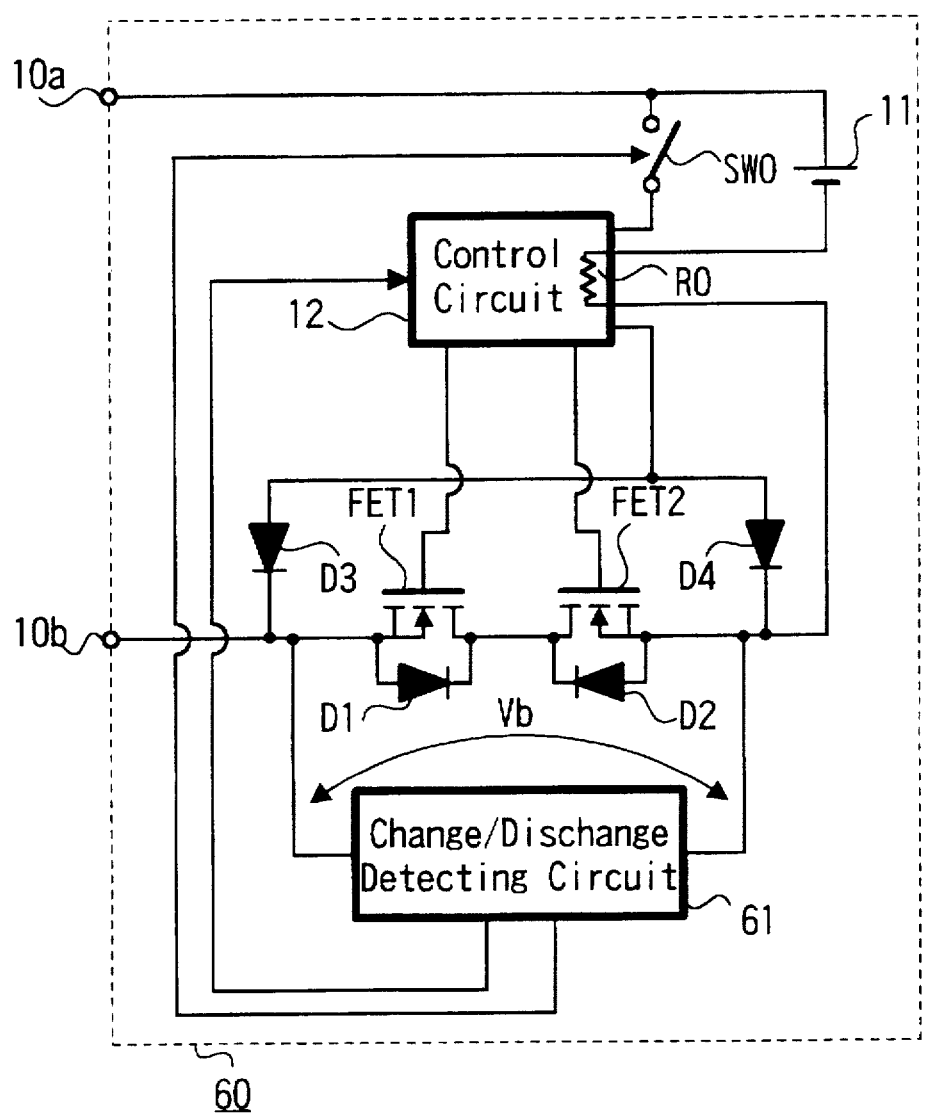
FIG. 13 is a diagram showing an arrangement of a battery package according to a sixth embodiment of the present invention.

A battery package according to a sixth embodiment of the present invention will be described with reference to FIG. 13. In FIG. 13 showing the battery package according to the sixth embodiment, like parts and units corresponding to those shown in FIGS. 2, 9 and 12 showing the battery package according to the first, second and fifth embodiments are marked with the same reference numerals and hence need not to be described in detail.

A battery package 60 shown in FIG. 13 according to the sixth embodiment is arranged such that the battery package 20 for detecting the charge state and the discharge state therein according to the second embodiment has the diodes D3, D4 shown in FIG. 12 according to the fifth embodiment instead of the switches SW1, SW2. Specifically, according to the battery package 60 of the sixth embodiment, a negative-side power-source input unit of a control circuit 12 is connected to a connection point between anodes of the diodes D3, D4. A cathode of the diode D3 is connected to a connection point between a terminal 10b and a transistor FET1. A cathode of the diode D4 is connected to a point between a transistor FET2 and a resistor R0.

A connection switch SW0 is provided between a positive-side power-source input unit of the control circuit 12 and a connection point between the positive electrode of a secondary battery 11 and a terminal 10a. A charge/discharge detecting circuit 61 incorporated in the battery package 60 controls the connection switch SW0. The charge/discharge detecting circuit 61 detects a polarity of a potential difference Vb between a voltage at a connection point between the terminal 10b and the transistor FET1 and a voltage at a connection point between the transistor FET2 and the resistor R0. When the polarity of the potential difference Vb is detected, if the voltage on the transistor FET2 side is higher than the voltage on the transistor FET1 side, then the charge/discharge detecting circuit 61 detects that the state of the secondary battery 11 is the charge state. When the polarity of the potential difference Vb is detected, if the voltage on the transistor FET1 side is higher than the voltage on the transistor FET2 side, then the charge/discharge detecting circuit 61 detects that the state of the secondary battery 11 is the discharge state.

The charge/discharge detecting circuit 61 supplies the information based on the detected state to the control circuit 12 and, when detecting either of the charge and discharge states, controls the connection switch SW0 to be set in its connected state.

In the sixth embodiment, other parts and units of the battery package 60 are arranged similarly to the battery package 50 according to the fifth embodiment shown in FIG. 12.

According to the sixth embodiment, since the switches SW1, SW2 are not provided, the switch controlled by the external-signal detecting circuit 61 is only the switch SW0, which simplifies the arrangement for controlling the switch of the battery package to that extent. As described in the first embodiment, the positive-side power-source input unit of the control circuit 12 may be connected directly to the positive-electrode of the secondary battery 11 without the switch SW0 being provided.

In the sixth embodiment, when the charge operation or the discharge operation is started, the transistor FET1 or FET2 may be set in its high-impedance state to detect the state of the secondary battery 11.

Figure 14:
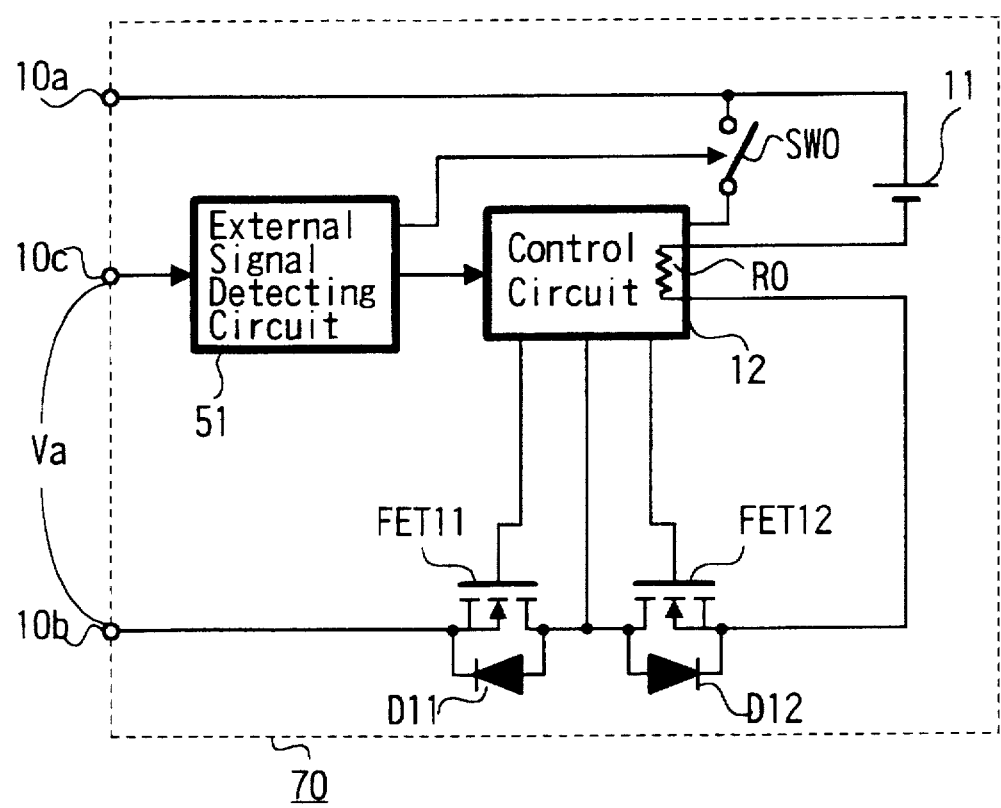
FIG. 14 is a diagram showing an arrangement of a battery package according to a seventh embodiment of the present invention.
Figure 15:
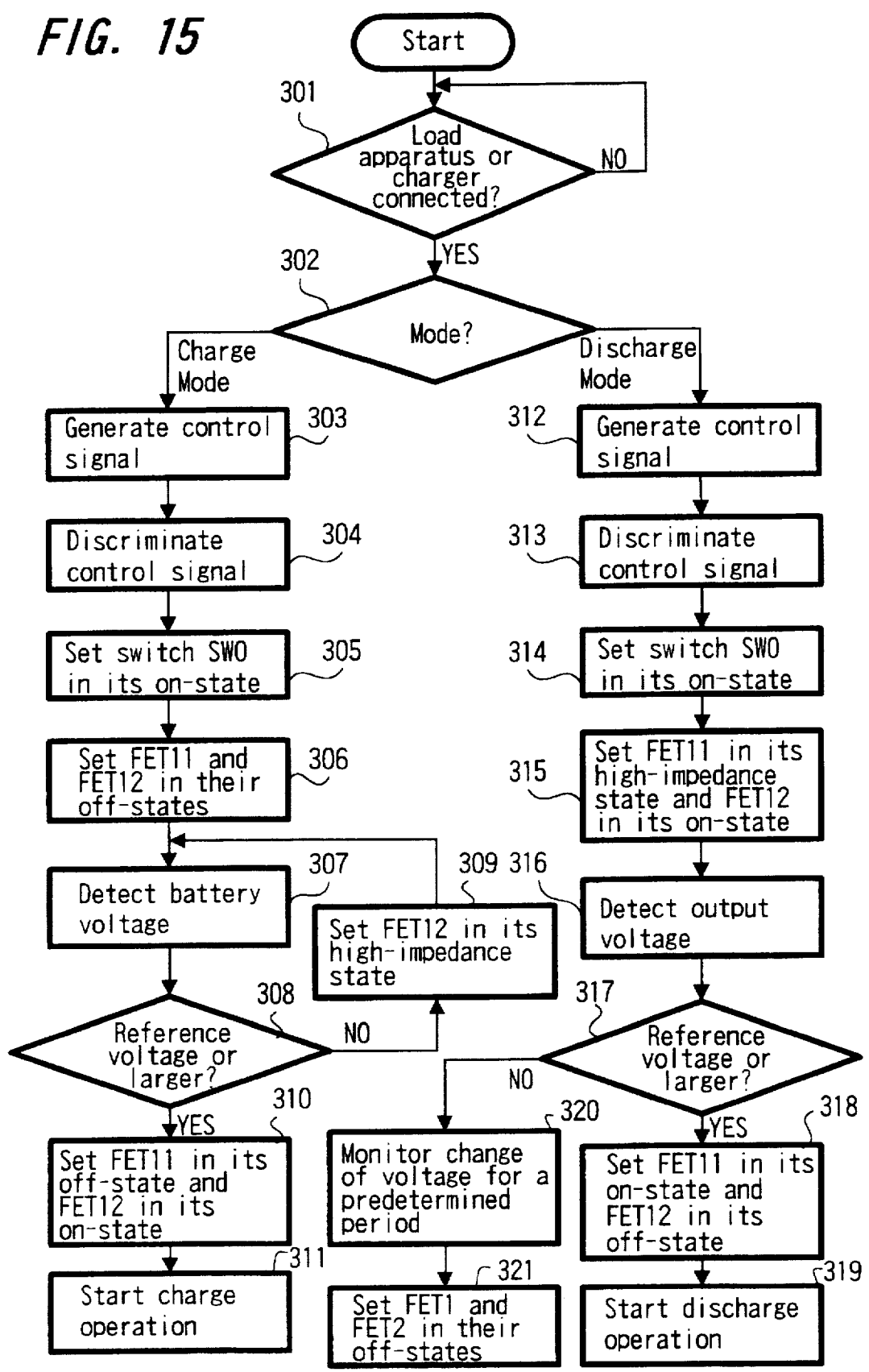
FIG. 15 is a flowchart used to explain charge and discharge operations of the battery package according to the seventh embodiment.

A battery package according to a seventh embodiment of the present invention will be described with reference to FIGS. 14 and 15. In FIG. 14 showing the battery package according to the seventh embodiment, like parts and units corresponding to those shown in FIGS. 2 and 12 showing the battery package according to the first and fifth embodiments are marked with the same reference numerals and hence need not to be described in detail.

A battery package 70 according to the seventh embodiment shown in FIG. 14 has a field effect transistor which is a switching means for controlling the charge and discharge operations and which also serves as a switching means for supplying the power source to a control circuit 12. Specifically, as shown in FIG. 14, a resistor R0 and two field effect transistors FET11, FET12 are connected in serial between a negative-side terminal 10b and a negative electrode of a secondary battery 11. In this case, respective connection directions of the transistors FET11 and FET12 are set reversely to those of the transistors FET1 and FET2 described in the first embodiment.

Specifically, the negative electrode side of the secondary battery 11 is connected through the resistor R0, the transistor FET12, the transistor FET11 to the terminal 10b in this order. Respective connection directions between sources and drains of the transistors FET11 and FET12 are set as follows. The transistor FET11 is connected so as to restrict a current flowing from the terminal 10b toward the secondary battery 11 based on a signal obtained at its gate from the control circuit 12 (control of the control circuit 12 on the transistor FET11 is the same as the control thereof on the transistor FET2 in the first embodiment).

The transistor FET12 is connected so as to restrict a current flowing from the secondary battery 11 toward the terminal 10b based on a signal obtained at its gate from the control circuit 12 (control of the control circuit 12 on the transistor FET12 is the same as the control thereof on the transistor FET1 in the first embodiment). In this case, the transistors FET11, FET12 are connected with diodes D11, D12 which allow currents to flow therethrough in the directions opposite to the directions where the respective transistors FET11, FET12 restrict currents.

A middle point of connection between both of the transistors FET11, FET12 is connected to the negative-side a power-source input unit of the control circuit 12. In the seventh embodiment, other parts and units of the battery package 70 are arranged similarly to those of the battery package 50 according to the fifth embodiment shown in FIG. 12.

Charge and discharge operations of the battery package 70 according to the seventh embodiment will be described with reference to FIG. 15 which is a flowchart therefor. In step 301, when being connected to a charger or a load apparatus, the operation of the battery package 70 is started. Then, the processing proceeds to step 302. When the battery package 70 is connected to the load apparatus or the charger, it must be discriminated whether the charge processing or the discharge processing is to be carried out. Therefore, it is discriminated in step 302 whether the mode is set as the charge mode or the discharge mode.

When the mode is set as the charge mode in step 302, the processing proceeds to step 303, wherein the charger connected to the battery package 70 generates a control signal having a predetermined potential and indicating that the charger is to charge the secondary battery 11, and supplies the generated control signal through the terminal 10c to an external-signal detecting circuit 51 of the battery package 70. The processing proceeds to step 304, wherein the external-signal detecting circuit 51 discriminates the supplied control signal. At this time, since the external-signal detecting circuit 51 detects the potential corresponding to the charge state, the processing proceeds to step 305, wherein the connection switch SW0 is set in its on-state. When the connection switch SW0 is brought in its on-state, the power supply from the connected charger side is supplied to the control circuit 12 in the battery package 70. Specifically, the power source from the charger side is supplied through the switch SW0 and the parasitic diode D11 of the transistor FET11 to the control circuit 12. The control circuit 12 is operated by the supplied power source and discriminates that the charge operation is to be carried out, based on the signal from the external-signal detecting circuit 51. The processing proceeds to step 306.

In step 306, based on the discriminated results, the control circuit 12 sets the transistors FET11 and FET12 in their off-states. The processing proceeds to step 307, wherein the control circuit 12 detects the battery voltage of the secondary battery 12 in this state. The processing proceeds to step 308, wherein the control circuit 12 determines whether or not the battery voltage is equal to or higher than a voltage allowing an ordinary charge (reference voltage). If it is determined in step 308 that the detected voltage is equal to or higher than the reference voltage, then the processing proceeds to step 310, wherein the transistor FET12 is set in its on-state. Then, the processing proceeds to step 311, wherein the charge operation is started. At this time, the charging current flows through the transistor FET12 and the parasitic diode D11.

If on the other hand it is determined in step 308 that the detected voltage is lower than the reference voltage, then the processing proceeds to step 309, wherein the control circuit 12 sets the transistor FET12 in its high-impedance state. Then, the processing returns to step 307. Then, the processings in steps 307 and 308 are repeated. If it is determined in step 308 that the detected voltage is equal to or higher than the reference voltage, then the processing proceeds to step 310, wherein the charge operation is started.

When the mode is set as the discharge mode in step 302, the processing proceeds to step 312, wherein the load apparatus connected to the battery package 70 generates a control signal having a predetermined potential and indicating that the load apparatus is to discharge the secondary battery 11, and supplies the generated control signal through the terminal 10c to the external-signal detecting circuit 51 of the battery package 70. The processing proceeds to step 313, wherein the external-signal detecting circuit 51 discriminates the supplied control signal. At this time, since the external-signal detecting circuit 51 detects the potential corresponding to the discharge state, the processing proceeds to step 314, wherein the connection switch SW0 is set in its on-state. When the connection switch SW0 is brought in its on-state, the power supply from the secondary battery 11 is supplied to the control circuit 12. Specifically, the power source from the secondary battery 11 is supplied to the control circuit 12 through the connection switch SW0 and the parasitic diode D12 of the transistor FET12. The control circuit 12 is operated by the supplied power source and discriminates that the discharge operation is to be carried out, based on the signal from the external-signal detecting circuit 51. The processing proceeds to step 315.

In step 315, based on the discriminated results, the control circuit 12 sets the transistor FET11 in its high-impedance state and the transistor FET2 in its on-state. The processing proceeds to step 316, wherein the control circuit 12 detects the output voltage of the secondary battery 11 in this state. The processing proceeds to step 317, wherein the control circuit 12 determines whether or not the output voltage is equal to or higher than a voltage suitable for the discharge (reference voltage). If it is determined in step 317 that the detected voltage value is equal to or higher than the reference voltage, then the processing proceeds to step 318, wherein the control circuit 12 sets the transistor FET11 in its on-state and the transistor FET2 in its off-state. The processing proceeds to step 319, wherein the discharge operation is started.

If it is determined in step 317 that the detected voltage is lower than the reference voltage, then the processing proceeds to step 320, wherein the control circuit 12 monitors change of the output voltage for a predetermined time. Then, the processing proceeds to step 321, wherein the control circuit 12 sets both of the transistors FET11 and FET12 in their off-states to stop the discharge operation.

According to the seventh embodiment, since the switches SW1, SW2 are not provided similarly to the fifth embodiment, the switch controlled by the external-signal detecting circuit 51 is only the switch SW0, which simplifies the arrangement for controlling the switch. Since the parasitic diodes D11, D12 serve as the diodes D3, D4, it is possible to further simplify the arrangement. As described in the first embodiment, in the seventh embodiment the positive-side power-source input unit of the control circuit 12 may be connected directly to the positive-electrode of the secondary battery 11 without the switch SW0 being provided.

Figure 16:
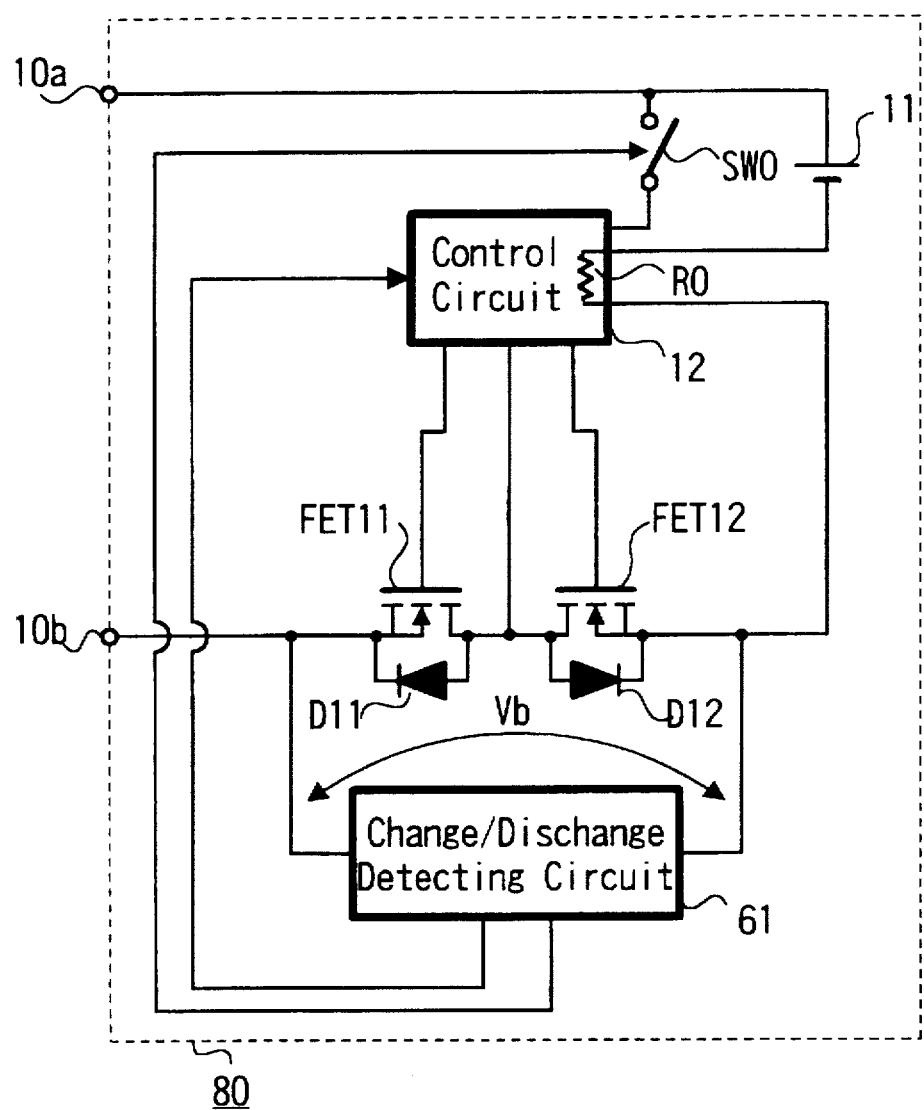
FIG. 16 is a diagram showing an arrangement of a battery package according to an eighth embodiment of the present invention.

A battery package according to an eighth embodiment of the present invention will be described with reference to FIG. 16. In FIG. 16 showing the battery package according to the eighth embodiment, like parts and units corresponding to those shown in FIGS. 2, 13 and 14 showing the battery package according to the first, sixth and seventh embodiments are marked with the same reference numerals and hence need not to be described in detail.

Similarly to the battery package 70 according to the seventh embodiment, a battery package 80 according to the eighth embodiment shown in FIG. 16 has a field effect transistor which is a switching means for controlling the charge and the discharge operations and which also serves as a switching means for supplying the power source to a control circuit 12. In this case, a charge/discharge detecting circuit 61 in the battery package 80 detects the charge or discharge state as described in the sixth embodiment. Specifically, as shown in FIG. 16, a resistor R0 and two field effect transistors FET11 and FET12 are connected in serial between a negative-side terminal 10b and a negative electrode of a secondary battery 11. In this case, respective connection directions of the transistors FET11, FET12 are set reversely to connection directions of the transistors FET1, FET2 described in the first embodiment.

The charge/discharge detecting circuit 61 detects a polarity of a potential difference Vb between a voltage at a connection point between the terminal 10b and the transistor FET11 and a voltage at a connection point between the transistor FET12 and the resistor R0. When the polarity of the potential difference vb is detected, if the voltage on the transistor FET12 side is higher than the voltage on the transistor FET11 side, then the charge/discharge detecting circuit 61 detects that the state of the secondary battery 11 is the charge state. When the polarity of the potential difference Vb is detected, if the voltage on the transistor FET11 side is higher than the voltage on the transistor FET12 side, then the charge/discharge detecting circuit 61 detects that the state of the secondary battery 11 is the discharge state.

The charge/discharge detecting circuit 61 supplies the information based on the detected state to the control circuit 12 and, when detecting either of the charge and discharge states, controls the connection switch SW0 to be set in its connected state.

In the eighth embodiment, other parts and units of the battery package 80 are arranged similarly to the battery package 70 according to the seventh embodiment shown in FIG. 14.

According to the eighth embodiment, since the switches SW1, SW2 are not provided similarly to the seventh embodiment, the switch controlled by the external-signal detecting circuit 61 is only the switch SW0, which simplifies the arrangement for controlling the switches to that extent. Since the parasitic diodes D11, D12 serve as the diodes D3, D4, it is possible to further simplify the arrangement. Moreover, since the charge and discharge states are detected in the battery package 80, this can simplify the arrangement of the secondary battery pack 80. As described in the first embodiment, the positive-side power-source input unit of the control circuit 12 may be connected directly to the positive-electrode of the secondary battery 11 without the switch SW0 being provided.

While the lithium ion battery is employed as the secondary battery incorporated in the battery package in each of the first to eighth embodiments, a secondary battery having other arrangement may be incorporated in the battery package.

According to the present invention, since the control means forming the protecting circuit is supplied with the power source from the outside when the secondary battery is charged, it is possible to carry out the charge operation regardless of the residual capacity of the incorporated secondary battery. Since the incorporated secondary battery supplies the power source to the control means when the secondary battery is discharged, it is possible to carry out the discharge operation satisfactorily.

In this case, if another switch (i.e., the switch SW0 shown in the embodiments) controlled in response to the state detected by the detecting means is provided, then the control means can be completely separated from the terminal side when the control means is not operated. Therefore, even if the terminal units are short-circuited, the control means can be prevented from being damaged due to the short circuit.

Since the state detecting means detects the signal from the outside to thereby detect the charge state or the discharge state, it is possible to satisfactorily control the charge and discharge operations based on the control signal from the outside.

Since the state detecting means detects the polarity of the potential difference between the voltage at the one terminal unit and the voltage across the secondary battery to thereby detect the charge state or the discharge state, it is possible to detect the charge state and the discharge state only by employing the detection processing carried out in the battery package, and the supply of the control signal from the outside becomes unnecessary, which can simplify the arrangement of the battery package.

Since the switching means for controlling the charge and discharge operations is formed of a first charge/discharge control switching means for switching a current used for charging the secondary battery on and off and a second charge/discharge control switching means for switching a current used for discharging the secondary battery on and off, it is possible to satisfactorily control the charge and discharge operations by employing the two switching means formed of the field effect transistors or the like.

In this case, when the state detecting means detects the charge state, the first charge/discharge control switching means is set in its high-impedance state to detect the battery voltage and thereafter the first charge/discharge control switching means is set in its on-state to start the charge operation. When the state detecting means detects the discharge state, the second charge/discharge control switching means is set in its high-impedance state to detect the output voltage and thereafter the second charge/discharge control switching means is set in its on-state to start the discharge operation. Therefore, it is possible to precisely determine the state of the secondary battery to thereafter carry out the charge and discharge operations, which can satisfactorily prevent the overcharge and the overdischarge.

Since the diodes are connected instead of the first and second switching means for supplying the power source to the control means, the control of the first and second switching means for supplying the power source to the control means becomes unnecessary, which can simplify the arrangement of the battery package.

Moreover, since the first charge/discharge control switching means also serves as the second switching means for supplying the power supply to the control means and the second charge/discharge control switching means also serves as the first switching means for supplying the power supply to the control means, it is possible to further simplify the arrangement of the battery package.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A secondary battery pack comprising:

terminal means connected to an external device;

rechargeable battery means for storing and utilizing electric charges;

switching means for switching operations of said rechargeable battery means between a charge operation and a discharge operation;

detecting means connected to said terminal means for detecting whether a charge operation or a discharge operation is to be carried out;

control means for controlling the switching of said switching means in response to a detection of said detecting means;

first power-source switching means for switching a supply of a power source to said control means and controlled in response to the charge operation or the discharge operation detected by said detecting means; and second power-source switching means for switching the supply of the power source to said control means and controlled in response to the charge operation or the discharge operation detected by said detecting means.

2. The secondary batter pack according to claim 1, further comprising:

third power-source switching means for switching a supply of a power source to said control means and controlled in response to the charge operation or the discharge operation detected by said detecting means.

3. The secondary battery pack according to claim 1, wherein said detecting means detects the charge operation or discharge operation by detecting a signal generated by said external device and fed in at said terminal means.

4. The secondary battery pack according to claim 1, wherein said detecting means detects the charge operation or the discharge operation by detecting a polarity of a voltage difference between a voltage at one terminal of said terminal means and a voltage at one electrode of said rechargeable battery means.

5. The secondary battery pack according to claim 2, wherein said detecting means detects the charge operation or the discharge operation by detecting a signal generated by said external device and fed in at said terminal means.

6. The secondary battery pack according to claim 2, wherein said detecting means detects the charge operation or the discharge operation by detecting a polarity of a voltage difference between a voltage at one terminal of said terminal means and a voltage at one electrode of said rechargeable battery means.

7. The secondary battery pack according to claim 1, wherein said switching means includes:

a first switch for controlling a current used to charge said rechargeable battery means; and a second switch for controlling a current used to discharge said rechargeable battery means.

8. The secondary battery pack according to claim 7, wherein said first switch and said second switch are formed of field effect transistors.

9. The secondary battery pack according to claim 7, wherein said detecting means comprises:

voltage detecting means for detecting a voltage corresponding to a charge/discharge current of said rechargeable battery means, wherein when said voltage detecting means detects a charge operation, said first switch is initially set in a high-impedance state and subsequently set in an on-state when said voltage detecting means detects a predetermined voltage or higher, and wherein when said voltage detecting means detects a discharge operation, said second switch is initially set in a high-impedance state and subsequently set in an on-state when said voltage detecting means detects the predetermined voltage or higher.

10. The secondary battery pack according to claim 1, wherein said first power-source switching means and said second power-source switching means are formed of diodes.

11. The secondary battery pack according to claim 10, wherein said detecting means detects the charge operation and the discharge operation by detecting a signal generated by said external device fed in at said terminal means.

12. The secondary battery pack according to claim 10, wherein said detecting means detects the charge operation and the discharge operation by detecting a polarity of a voltage difference between a voltage at one terminal of said terminal means and a voltage at one electrode of said rechargeable battery means.

13. A secondary battery pack comprising:

terminal means connected to an external device;

rechargeable battery means for storing and utilizing electric charges;

first switching means for controlling a current used to charge said rechargeable battery means in a charge operation;

second switching means for controlling a current used to discharge said rechargeable battery means in a discharge operation;

detecting means for detecting whether the charge operation or the discharge operation is to be carried out; and control means for controlling switching of said first and second switching means in response to a detection by said detecting means, wherein a power supply terminal of said control means is connected between said first switching means and said second switching means.

14. The secondary battery pack according to claim 13, further comprising:

power switching means for switching a supply of a power source to said control means in response to the charge operation or the discharge operation detected by said detecting means.

15. The secondary battery pack according to claim 13, wherein said detecting means detects the charge operation or the discharge operation by detecting a signal generated by said external device.

16. The secondary battery pack according to claim 13, wherein said detecting means detects the charge operation or the discharge operation by detecting a polarity of a voltage difference between a voltage at one terminal of said terminal means and a voltage at one electrode of said rechargeable battery means.

17. The secondary battery pack according to claim 14, wherein said detecting means detects the charge operation or the discharge operation by detecting a signal generated by said external device fed in at said terminal means.

18. The secondary battery pack according to claim 14, wherein said detecting means detects the charge operation or the discharge operation by detecting a polarity of a voltage difference between a voltage at one terminal of said terminal means and a voltage at one electrode of said rechargeable battery means.

19. A method of controlling charge/discharge operations of a secondary battery pack, comprising the steps of:
   detecting a connection to one of a load apparatus and a charger;
   detecting whether a charge mode or discharge mode is to be operated; and
   setting a switching circuit in a predetermined state, wherein when said charge mode is detected, power from a power source is supplied by said charger to a control circuit and said switching circuit is set in said charge mode, and wherein when said discharge mode is detected, power from the power source is supplied by the secondary battery to said control circuit and said switching circuit is set in said discharge mode.

20. A method of controlling charge/discharge operations of a secondary battery pack, comprising the steps of:
   detecting a connection to one of a load apparatus and a charger;
   detecting whether a charge mode or discharge mode is to be operated; and
   setting a switching circuit in a predetermined state, wherein when said charge mode is detected, power from a power source is supplied to a control circuit by said charger, a voltage of a secondary battery is detected and said switching circuit is set in said charge mode when said detected battery voltage is higher than a reference voltage, and wherein when said discharge mode is detected, power from the power source is supplied to a control circuit by said secondary battery, a voltage of said secondary battery is detected, and said switching circuit is set in said discharge mode.

21. The method of controlling charge/discharge operations of a secondary battery pack according to claim 20, wherein when setting said switching circuit when said discharge mode is detected, power from the power source is supplied to said control circuit by said secondary battery, a voltage of said secondary battery is initially detected, a voltage of said secondary battery is subsequently detected after a fixed time period, and when said detected voltage is lower than said reference voltage, said switching circuit is set in a high-impedance state.

22. The method of controlling charge/discharge operations of a secondary battery pack according to claim 21, wherein when a voltage of said secondary battery is subsequently detected after said fixed time period, a change of a discharge current of said secondary battery is monitored and an impedance of said switching circuit is gradually changed.

23. The method of controlling charge/discharge operations of a secondary battery pack according to claim 21, wherein in said high impedance state, said switching circuit is substantially in an off-state.

24. The method of controlling charge/discharge operations of a secondary battery pack according to claim 21, wherein in said high impedance state, said switching circuit is periodically and alternately set in an on-state and in an off-state.

25. The method of controlling charge/discharge operations of a secondary battery pack according to claim 20, wherein after the charge or discharge mode is detected, said switching circuit is set to a high-impedance state, a state of said secondary battery is detected, and said switching circuit is set to a predetermined mode.

26. An electronic apparatus having a secondary battery, comprising:
   a secondary battery pack including:
   terminal means connected to an external device;
   rechargeable battery means for storing and utilizing electric charges corresponding to a charge operation and a discharge operation, respectively;
   switching means for switching between the charge operation and the discharge operation of said rechargeable battery means;
   detecting means for detecting whether the charge operation or the discharge operation is to be carried out;
   control means for controlling said switching means in response to a detection of said detecting means;
   first power switching means for switching a supply of a power source to said control means and controlled in response to the charge operation or the discharge operating detected by said detecting means; and
   second power switching means for switching a supply of the power source to said control means and controlled in response to the charge operation or the discharge operation detected by said charge/discharge state detecting means;
   battery terminal means connected to said secondary battery pack;
   external power-supply terminal means connected to an external power supply; and
   functional circuit means connected to one of said battery terminal means and said external power supply terminal means for carrying out a predetermined operation of said rechargeable battery means.

* * * * *